United States Patent [19]
Noltemeyer et al.

[11] Patent Number: 5,479,894
[45] Date of Patent: Jan. 2, 1996

[54] TWO-STROKE INTERNAL COMBUSTION ENGINE

[75] Inventors: Friedrich Noltemeyer, Waiblingen; Alfred Hoppe, Stuttgart; Jürgen Münzenmaier, Remshalden; Friedrich Rusch, Stuttgart; Günter Karl, Esslingen, all of Germany

[73] Assignee: Mercedes-Benz AG, Stuttgart, Germany

[21] Appl. No.: 272,828

[22] Filed: Jul. 11, 1994

[30] Foreign Application Priority Data

Jul. 10, 1993 [DE] Germany ............ 43 23 159.4

[51] Int. Cl.⁶ .................. F02F 7/00; F02B 25/14
[52] U.S. Cl. .............................. 123/74 AC
[58] Field of Search ............ 123/74 AC, 65 P, 123/65 PE, 73 PP, 74 R, 74 A, 74 AA, 74 AE

[56] References Cited

U.S. PATENT DOCUMENTS

| | | | |
|---|---|---|---|
| 1,198,497 | 9/1916 | Wheeler | 123/74 AC |
| 1,311,148 | 7/1919 | Burns | 123/74 AA |
| 1,378,254 | 5/1921 | MacDonald | 123/74 AC |
| 1,794,405 | 3/1931 | Humpert | 123/74 AC |
| 3,382,857 | 5/1968 | Foster et al. | 123/74 R |
| 4,115,037 | 9/1978 | Butler | 123/74 AC |

FOREIGN PATENT DOCUMENTS

| | | |
|---|---|---|
| 3206152 | 8/1983 | Germany . |
| 3327225 | 2/1985 | Germany . |
| 0310317 | 1/1930 | United Kingdom . |
| 0523182 | 1/1946 | United Kingdom . |
| 1155085 | 6/1969 | United Kingdom . |

OTHER PUBLICATIONS

Patent Abstracts of Japan vol. 12 No. 19 (M-679(2938) Mar. 24, 1988.
KSZ 90/160 of MAN from "Design and Principal Dimensions of the Internal Combustion Engine", Harald Maass, Springer Verlag Dec. 1979, p. 214, Fig. 5.62.

*Primary Examiner*—Marguerite Macy
*Attorney, Agent, or Firm*—Klaus J. Bach

[57] ABSTRACT

In a two-stroke internal combustion engine with an engine block including a crankcase and a cylinder housing receiving pistons which are connected to a crankshaft by crosshead rods with crossheads guided for linear movement with the piston and a connecting rod extending between the crosshead and the crankshaft, wherein the cylinders have walls with inlet and outlet slits disposed above the bottom dead-center position of the piston and providing for communication between the cylinder and inlet and outlet channel structures formed in the cylinder housing around the pistons, the engine block consists of a cylinder housing and a crankcase joined along a dividing plane extending across the engine block below the lowest piston ring when the piston is in its bottom position and the cylinder housing includes channel structures which are open toward the dividing plane and have walls extending inwardly and have inner surfaces in engagement with the piston for guiding said piston and to form, with the piston skirt, the gas inlet and outlet channels through which gases are supplied to, and discharged from, the cylinder.

3 Claims, 3 Drawing Sheets

TWO-STROKE INTERNAL COMBUSTION ENGINE

BACKGROUND OF THE INVENTION

The invention relates to a two-stroke internal combustion engine with a piston having a crosshead movable therewith and a connecting rod extending between the crosshead and the crankshaft of the engine, the crosshead being guided for linear movement with the piston.

A two-stroke internal combustion engine of this type is already known (KSZ 90/160 of MAN) from DE-B "Gestaltung und Hauptabmessungen der Verbrennnungskraftmaschine (Design and Principal Dimensions of the Internal-Combustion Engine), Harald Maass, Springer Verlag 1979, page 214, Figure 5.62". The engine shown therein has an engine block with a crankcase and with a cylinder housing having a cylinder, in which a piston acts on a crankshaft via a crosshead rod, a crosshead together with crosshead guide and a connecting rod. Arranged between the crankcase and cylinder housing is a partition wall which comprises a sleeve projecting from the crankcase into the cylinder, so that in the bottom dead-center region of the piston, the piston skirt extends partially into the space between the outer contour of the sleeve and the inner contour of the cylinder.

For general background, attention is also drawn to the publications German Patent Specification 3,327,225 and German Offenlegungsschrift 3,206,152.

One disadvantage of internal combustion engines of this type is the complicated design of the engine block with its slits (inlet and outlet slits) and channels (inlet and outlet channel).

Furthermore, known engine blocks which are provided with undercuts for the channels are produced by casting utilizing sand cores and they are subsequently machined at least at the top edges of the slits (control function for gas exchange). A disadvantage of this is the high costs of subsequent machining and the restricted access for chip-removing tools to the slit top edges located inside the cylinder. Moreover, a further disadvantage in the production of engine blocks of this type is to be seen in that the sand cores have to be prepared anew for each new casting.

It is the principal object of the present invention to provide an engine block of an internal combustion engine of the general type in such a way that its production is substantially simpler and more cost-effective in comparison with the hitherto known state of the art.

SUMMARY OF THE INVENTION

In a two-stroke internal combustion engine with an engine block including a crankcase and a cylinder housing receiving pistons which are connected to a crankshaft by crosshead rods with crossheads guided for linear movement with the piston and a connecting rod extending between the crosshead and the crankshaft, wherein the cylinders have walls with inlet and outlet slits disposed above the bottom dead-center position of the piston and providing for communication between the cylinder and inlet and outlet channel structures formed in the cylinder housing around the pistons, the engine block consists of a cylinder housing and a crankcase joined along a dividing plane extending across the engine block below the lowest piston ring when the piston is in its bottom position and the cylinder housing includes channel structures which are open toward the dividing plane and have walls extending inwardly and have inner surfaces in engagement with the piston for guiding said piston and to form, with the piston skirt, the gas inlet and outlet channels through which gases are supplied to, and discharged from, the cylinder.

The division according to the invention of the engine block into crankcase and cylinder housing and the arrangement of the inlet channels and the inlet slits thereby made possible makes the motor block quite simple so that manufacture of the engine block is substantially facilitated and it can therefore be made more cost-effectively than it is possible with the relevant state-of-the-art motor blocks. Specifically, it is possible to utilize casting methods with permanent molds, such as chill casting or die casting, instead of casting methods with dead molds (for example, sand casting).

As a result of the use of the die-casting method in the production of the engine block, the inherent advantages of this casting method are also obtained, for example, the good dimensional accuracy and high surface quality of the engine block. The achievable dimensional accuracy thus makes the expensive reworking of the slit top edges unnecessary. As a result of the high surface quality, the walls of the channels become smoother, thereby improving the gas flow quality in the channels.

In a preferred arrangement the channels are open at the dividing plane which arrangement is especially simple to produce.

Since, in engines of the crosshead type, in which the lateral guiding force is provided by the crosshead guide, there are no side forces between the piston and cylinder, a sufficient guidance of the piston rings of the piston is ensured by the webs between the channel parts.

Further features and advantages of the invention will become apparent from the following description in which the invention is explained in greater detail on the basis of an exemplary embodiment.

DESCRIPTION OF A PREFERRED EMBODIMENT

Figure 1:
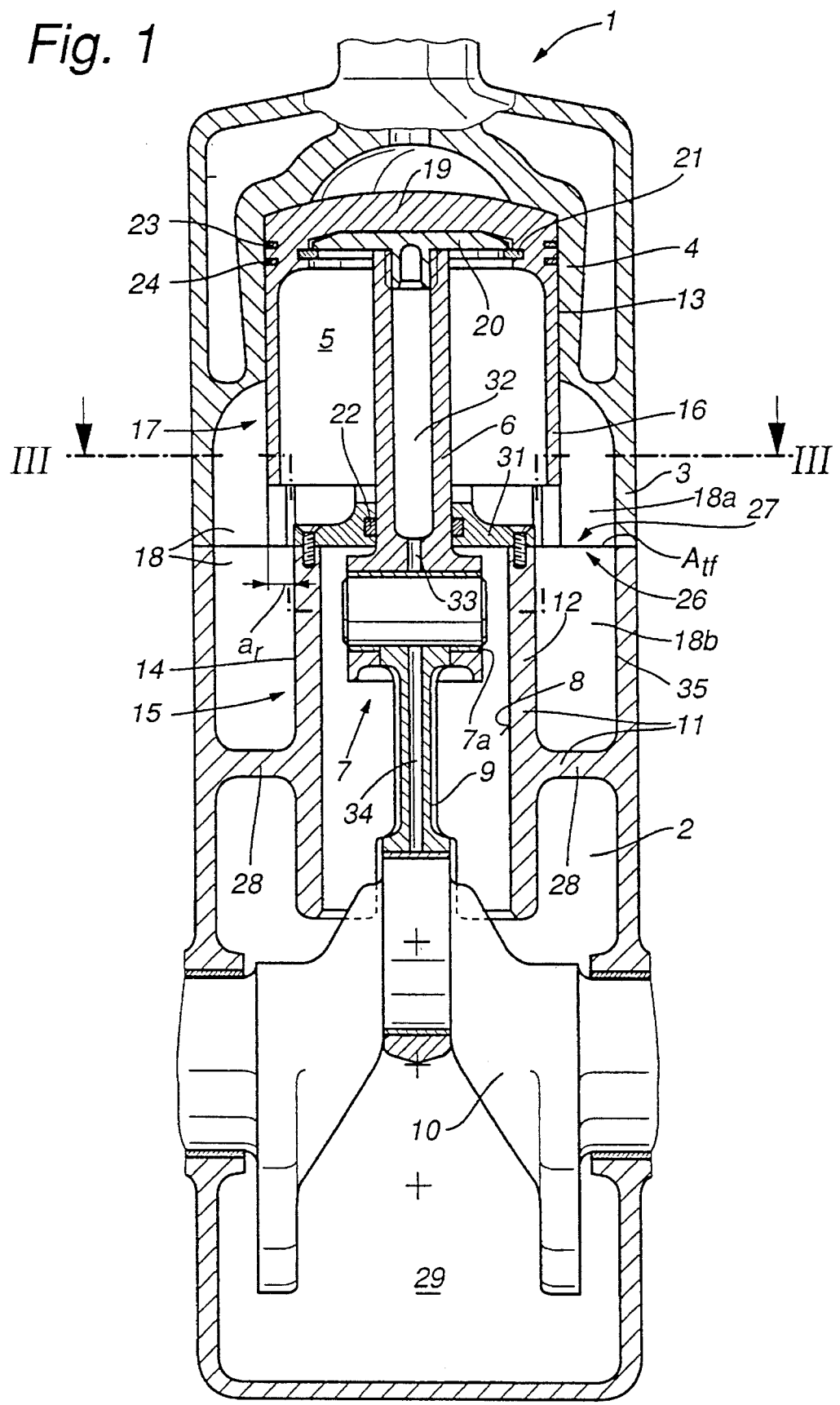
FIG. 1 shows a two-stroke internal combustion engine according to the invention with a divided engine block and with a piston located in the top dead-center position.
Figure 2:
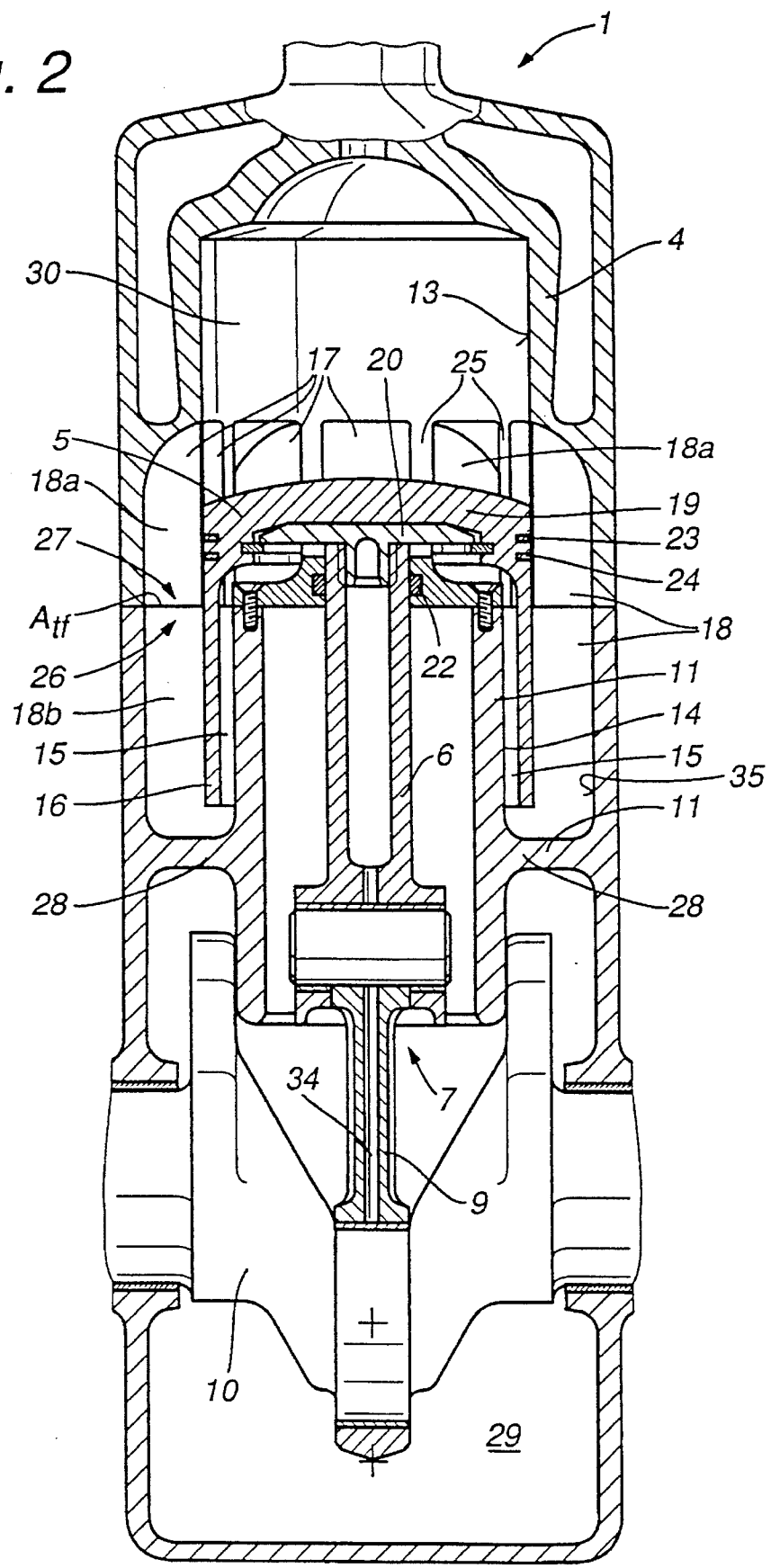
FIG. 2 shows the internal combustion engine of FIG. 1 with a piston located in the bottom dead-center position.

FIGS. 1 and 2 show a two-stroke internal combustion engine according to the invention with an engine block 1 which is divided in a dividing plane $A_{tf}$ into a crankcase 2 with crankspace 29 and a cylinder housing 3 with combustion chamber 30. Identical reference symbols are used for identical components of FIGS. 1 and 2.

The cylinder housing 3 comprises a cylinder 4, in which a piston 5 is connected to a crankshaft 10 via a crosshead rod 6, a crosshead 7 with crosshead joint 7a together with crosshead guide 8 and a connecting rod 9.

To separate the crankspace 29 from the area of the working space 30 including the combustion chamber the crankcase 2 includes a partition 11 which comprises a pot-shaped sleeve 12 open towards the crankspace 29 and having a cover 31. Between the inner contour 13 of the cylinder 4 and the outer contour 14 of the sleeve 12 there is a radial clearance $a_r$ forming an open space 15 for accommodating the piston skirt 16 of the piston 5 (see FIGS. 2 and 3).

The sleeve 12 with the cylinder-shaped crosshead guide 8 is supported on the crankcase 2 by means of a portion 28 of the partition 11 and takes up the lateral guiding forces of the crank mechanism exerted by the connecting rod 9.

Figure 3:
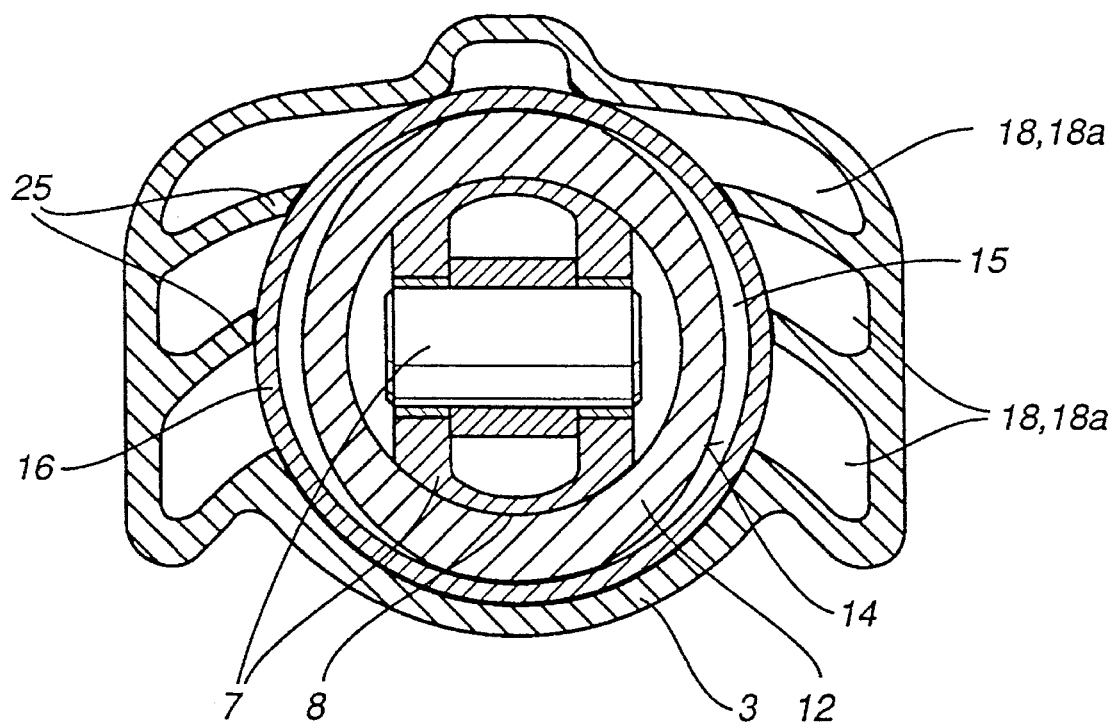
FIG. 3 is a cross-sectional view taken along line III—III of FIG. 1.

The part of the outer contour 14 of the sleeve 12 located above the partition part 28 is oval in cross-section in order to improve air flow and strength of the structure (see FIG. 3).

Located in the cylinder housing 3 are the inlet slits 17 which are flow passages controlled by the piston skirt 16. They are in communication with an inlet channel 18 having channel sections 18a in the cylinder housing 3 and channel sections 18b in the crankcase 2. Some are outlet slits (not shown) of an outlet channel. The inlet channel 18 and outlet channel form the gas channels of the internal combustion engine, through which the combustion chamber charge change takes place.

The piston 5 has a front wall 19 which with its underside is seated on a support plate 20 so as to be radially movable relative thereto, the support plane 20 being fastened to the upper end of the crosshead rod 6. A retaining ring 21 engages the piston 5 so as to retain it on the support plane 20, thereby guaranteeing pull-back of the piston 5 in the starting phase of the engine. When the latter is running, the resultant force arising from gas and mass forces always engages the piston 5 with the support plate 20.

The cylinder crosshead guide 8, in which the crosshead 7 is guided parallel to the axis of the cylinder, is formed in the sleeve 12. The crosshead rod 6 projecting from the crosshead 7 to the piston 5 extends through the cover 31 of the sleeve 12 and is axially movable in the said cover.

Located between the cover 31 which is screwed to the sleeve 12 and the crosshead rod 6 is a seal 22, by means of which the crankspace 29 is sealed with regard to the working space 30. This separation of the spaces 29 and 30, which is known in principle in crosshead internal combustion engines, ensures that, in contrast to the crankcase-scavenged two-stroke internal combustion engines, the well proven plain friction bearings lubricated with pressurized oil can be used for all engine bearings, instead of antifriction bearings which have a lower load-bearing capacity and which generate noise. Nevertheless the piston backside can still be utilized as a scavenging pump as it is common in two-stroke engines.

The channel portions 18a in the cylinder housing 3 which are separated from one another by webs 25 (see FIG. 2) are open towards the dividing plane $A_{tf}$ at their end 27, as is the channel portion 18b at its end 26.

The annular channel portion 18b of the inlet channel 18, which can accommodate part of the piston skirt 16, is formed between the outer contour 14 of the sleeve 12 located above the partition pat 28 and an inner contour 35 of the crankcase 2. Radial guidance of the piston 5 together with the piston rings 23 and 24 thus takes place, in its bottom dead-center position, solely by means of the webs 25, since the piston projects from the cylinder 4 below the dividing plane $A_{tf}$.

As a result of the relatively short crosshead rod, the crosshead joint 7a is disposed closely adjacent the bottom side of the piston front wall 19 so that, in the bottom dead-center position of the piston 5 as shown in FIG. 2, there is only room for the crosshead-rod seal (seal ring 22) in the cover 31 of the sleeve 12.

Since the piston 5 is not subjected to lateral forces as a result of the crosshead guide 8, the webs 25 between the slits 17 are sufficient for guiding the piston rings 23 and 24. The cylinder wall necessary in a trunk-piston engine design is omitted, so that the inlet channels 18 having the channels parts 18a and 18b are delimited on the cylinder side by the piston skirt 16. In multi-cylinder engines, the cylinder spacing and therefore the engine length are reduced as a result of the absence of this cylinder wall. Furthermore, because there are no lateral forces, the piston 5 together with the piston rings 23 and 24 requires only minor lubrication.

Good lubricating conditions are provided and virtually constant bearing plays are present in the cylindrical crosshead guide 8 wherein the lateral force caused by the inclination of the connecting rod 9 can be easily accommodated, and the connecting rod 9 can be made substantially shorter than in known two-stroke internal combustion engines. Despite the short connecting rod 9 (approximately 1.5 times the stroke), there is no appreciable increase in the friction losses for the crosshead guide 8.

The crosshead rod 6 has a cavity 32 which, for the purpose of the oil cooling of the piston 5, leads from the crosshead 7 to the underside of the piston front wall 19 and is connected to the oil circuit via connecting passages 33 and 34.

FIG. 3 is a sectional view taken along line III—III of FIG. 1. It shows the laterally arranged channel parts 18a of the inlet channel 18 with the webs 25 serving to guide the piston rings 23, 24 (see FIG. 1), and it further shows sleeve 12 with its oval outer contour 14 and the piston skirt 16 of the piston 5 and the piston skirt extending into the open space 15.

In a further version, the sleeve, instead of being cast directly onto the engine block, can also be made separately and mounted to the engine block.

What is claimed is:

1. A two-stroke internal combustion engine comprising an engine block having a crankcase with a crankshaft and a cylinder housing including at least one cylinder having a cylinder axis and in each cylinder a piston with piston rings and a downwardly extending cylindrical skirt, a crosshead and a crosshead rod connected to said piston for movement therewith, a crosshead guide structure for supporting said crosshead for linear movement along the axis of said cylinder, and a connecting rod extending between said crosshead and said crankshaft for transferring motion from said piston to said crankshaft, said piston having, in said cylinder, top and bottom dead-center positions and said cylinders having walls with inlet and outlet slits arranged above the bottom dead-center position of the piston and being in communication with gas inlet and outlet channels for conducting gas to and from said cylinder, said engine block consisting of a cylinder housing and a crankcase joined along a dividing plane extending across said engine block below the lowest piston ring of said piston when it is in the bottom dead-center position but above the bottom end of said cylindrical skirt, said cylinder housing including channel structures which are open toward said dividing plane and have walls projecting inwardly toward said piston so as to define, together with the skirt of said piston, said gas inlet and outlet channels said inwardly projecting walls extending downwardly only to said dividing plane so as to define, in the bottom dead center position of said piston, an open annular space around said piston skirt extending from said dividing plane downwardly into said crankcase.

2. A two-stroke engine according to claim 1, wherein said crankcase includes at least one channel structure which is open toward said dividing plane and is arranged so as to be in communication with gas channels formed by the channel structures in the cylinder housing.

3. A two-stroke engine according to claim 1, said inwardly projecting walls defining said adjacent channels in said cylinder housing have inner surfaces in engagement with said piston for guiding said piston and said piston rings.

* * * * *